(12) United States Patent
Feller et al.

(10) Patent No.: US 9,483,547 B1
(45) Date of Patent: Nov. 1, 2016

(54) CLUSTERING AND DISPLAY OF RECIPES

(71) Applicant: Yummly, Inc., Redwood City, CA (US)

(72) Inventors: David B. Feller, Mountain View, CA (US); Vadim Geshel, Redwood City, CA (US); Gregory Allen Druck, Jr., San Francisco, CA (US); Iurii Volodimirovich Korolov, Mountain View, CA (US)

(73) Assignee: Yummly, Inc., Redwood City, CA (US)

( * ) Notice: Subject to any disclaimer, the term of this patent is extended or adjusted under 35 U.S.C. 154(b) by 195 days.

(21) Appl. No.: 14/292,128

(22) Filed: May 30, 2014

(51) Int. Cl.
*G06F 17/30* (2006.01)

(52) U.S. Cl.
CPC .............. *G06F 17/30601* (2013.01)

(58) Field of Classification Search
None
See application file for complete search history.

(56) References Cited

U.S. PATENT DOCUMENTS

| | | | |
|---|---|---|---|
| 7,991,217 B2* | 8/2011 | Nakagaki ............. | G06K 9/6256 382/144 |
| 9,251,292 B2* | 2/2016 | Cheng ............... | G06F 17/30979 |
| 2005/0160114 A1* | 7/2005 | Hunt ..................... | G06Q 10/10 |
| 2006/0077387 A1* | 4/2006 | Sato ................ | G05B 19/41865 356/394 |
| 2007/0201739 A1* | 8/2007 | Nakagaki ............. | G06K 9/6256 382/149 |
| 2008/0215295 A1* | 9/2008 | Shiraishi ............. | G03F 7/70525 702/187 |
| 2008/0235232 A1* | 9/2008 | Moses .................... | G06Q 10/10 |
| 2008/0243638 A1* | 10/2008 | Chan ................. | G06F 17/30522 705/14.51 |
| 2008/0243815 A1* | 10/2008 | Chan ................. | G06F 17/30867 |
| 2008/0243816 A1* | 10/2008 | Chan ................. | G06F 17/30867 |
| 2008/0243817 A1* | 10/2008 | Chan ................. | G06F 17/30867 |
| 2014/0074649 A1* | 3/2014 | Patel .................. | G06Q 30/0631 705/26.7 |
| 2014/0089321 A1 | 3/2014 | Engel et al. | |
| 2014/0188566 A1* | 7/2014 | Pinel .................. | G06Q 30/0204 705/7.34 |
| 2014/0280148 A1 | 9/2014 | Stankiewicz | |
| 2015/0058065 A1* | 2/2015 | Pinel ................ | G06Q 10/06313 705/7.25 |
| 2015/0112843 A1* | 4/2015 | Pinel .................. | G06Q 10/0875 705/29 |
| 2015/0161912 A1* | 6/2015 | Bhattacharjya ........... | A61L 2/16 434/127 |

\* cited by examiner

*Primary Examiner* — Hung Le
(74) *Attorney, Agent, or Firm* — Fenwick & West LLP

(57) ABSTRACT

Recipes are hierarchically clustered into groups based on features of the recipes. Candidate clusters with a threshold number of clustered recipes having at least one feature in common are found by traversing the hierarchy. A plurality of clusters is selected for display to a user from among the candidates based on an objective function that considers the relevancy of the cluster as well as diversity of the clusters. A plurality of recipes within each selected cluster is selected for display to a user from among the recipes within the cluster based on an objective function that considers the quality of the recipe as well as the diversity of the recipes within the cluster. At least one feature that all of the recipes in a respective cluster have in common is used to generate a name for the cluster.

21 Claims, 7 Drawing Sheets

CLUSTERING AND DISPLAY OF RECIPES

BACKGROUND

1. Field of Disclosure

This disclosure relates to clustering recipes for display to a user.

2. Description of the Related Art

Many techniques are known in the art for generating recommendations for a user based on the user's profile, previous activities, expressed preferences, and other user-specific features or data. In large datasets and data rich environments, the number of generated recommendations may quickly swamp the user's ability to meaningfully engage with the recommendations, or exhaust the user's patience in sorting through them.

In the context of a website and online service devoted to recipes, quality recommendations are particularly important. One of the driving motivations for users of the service is to break away from familiar recipes and routine dishes. Thus, it is desirable to surprise and delight the user with a variety of fresh, intriguing recommendations likely to be of interest to the user, and to display them in a way that can be easily grasped.

SUMMARY

Embodiments include methods for hierarchically clustering recipes into groups based on features of the recipes. For example, the distance between pairs of recipes is calculated based on features of the recipes, and the closest pairs are iteratively grouped into clusters using an agglomerative hierarchical clustering technique. Candidate clusters with a threshold number of clustered recipes having at least one feature in common are found by traversing the hierarchy. A plurality of clusters is selected for display to a user from among the candidates based on an objective function that considers the relevancy of the cluster as well as diversity of the clusters. A plurality of recipes within each selected cluster is selected for display to a user from among the recipes within the cluster based on an objective function that considers the quality of the recipe as well as the diversity of the recipes within the cluster. At least one feature that all of the recipes in a respective cluster have in common is used to generate a name for the cluster.

Additional embodiments include computer-readable storage media storing computer-executable instructions for performing the steps described above. Further embodiments include systems comprising a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The Figures (FIGS.) and the following description describe certain embodiments by way of illustration only. One skilled in the art will readily recognize from the following description that alternative embodiments of the structures and methods illustrated herein may be employed without departing from the principles described herein.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality.

Recipe Clustering Environment

Figure 1:
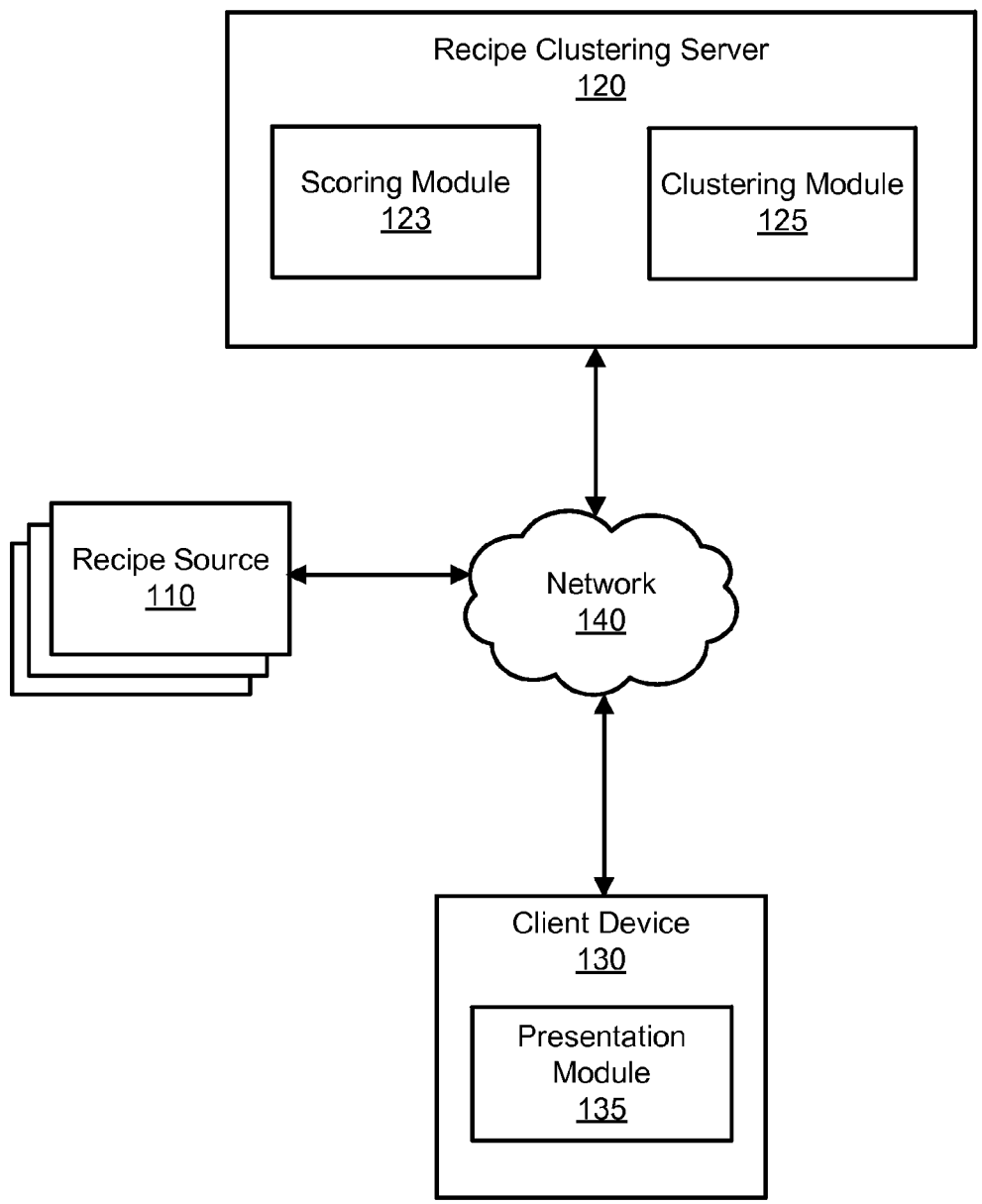
FIG. 1 is a high-level block diagram illustrating an environment for clustering recipes for display to a user, in accordance with an embodiment.

FIG. 1 is a high-level block diagram illustrating an environment 100 for clustering recipes for display to a user, in accordance with an embodiment. The environment 100 includes entities such as recipe sources 110, a recipe clustering server 120, a client device 130, and a network 140. Although single instances of some of the entities are illustrated, multiple instances may be present. For example, multiple client devices 130 associated with multiple users may access recipes through the recipe clustering server 120. The functionalities of the entities may be distributed among multiple instances. For example, a content distribution network (or a cloud-based network) of servers at geographically dispersed locations implements the recipe clustering server 120 to increase server responsiveness.

A recipe source 110 is a repository of recipes accessible by the recipe clustering server 120. In one embodiment, the recipe source 110 is a server hosting a webpage displaying recipes through a markup language (e.g., HTML) or another structured document format. A recipe source 110 may implement an application programming interface (API) functionality to provide recipe access to applications native to an operating system on a client device 130. The recipe source 110 may be implemented using a server, described further with respect to FIG. 3.

Alternatively or additionally, a recipe source 110 is a repository containing recipes in a structured document format. The repository may be a non-transitory computer-readable storage medium (e.g., a hard disk drive, an optical disc, a flash memory) accessible to the recipe clustering server through the network 140 or through a removable storage media interface. Non-transitory computer-readable storage media are further described with respect to FIG. 3.

The recipe clustering server 120 hosts recipes for display to the user of a client device 130. In one embodiment, the recipe clustering server 120 retrieves recipes from a recipe source 110 and analyzes the recipes to enable more uniform presentation through client devices 130 and to enable more efficient organization of recipes. The recipe clustering server 120 organizes recipes to present clustered recipes to a user of a client device 130. As another example, the recipe clustering server 120 maintains a user profile to log a user's preferences, dietary restrictions, search behavior, and culinary tastes. This user profile may be used to recommend items to a user and to increase relevance of search results to the user. The recipe clustering server 120 includes a scoring module 123 and a clustering module 125.

The scoring module 123 scores recipes using any technique known to those of skill in the art, and passes the scored recipes to the clustering module 125. For example, the scoring module 123 may generate recipe recommendations for a user by considering any combination of factors, including the user's profile, the user's past activities (including positive feedback on recipes and previous searches), and the user's social connections, to score item-based recommendations, content-based recommendations, or any combination of the two. Alternatively, the scoring module 123 may score recipes according to their relevance to a query entered by a user or score recipes according to their popularity with users, for example.

In one embodiment, the score assigned to each recipe by the scoring module 123 indicates how strongly the recipe is recommended for the user, plus or minus any score enhancements or penalties that are assessed. Although the specifics of the scoring criteria may vary based on implementation details, the recipes with the best scores are the ones where there is a higher likelihood that the user will be interested in the recipe as compared to the recipes with lower scores. The scoring of recipes can be accomplished using a scoring technique that enforces any policy determined by the administrators of the recipe clustering server 120 and optionally, the user receiving the recipe recommendations. An initial score may be determined from a scoring function that calculates how likely the user is to be interested in each recommended recipe based on the user's profile, previous activities, social connections, and/or any other factors. In other words, the initial scoring may be a measure of the relevancy of the recipe to a user. Additionally, policies can be implemented so as to boost the calculated initial scores of recipes that are deemed desirable based on one or more features of the recipe and/or penalize the calculated initial scores of the recipes that are deemed undesirable based on one or more features of the recipe. For example, a policy that highly values new recipes over recipes that the user has seen before may be implemented by providing a positive score modifier to any recipe that the user had not seen before, providing a negative score modifier to any recipe that the user has seen before, or some combination of the two. Similar policies could be used to modify the scores of recipes using produce in season or out of season, recipes from particular sources, popular recipes, or modify the scores of the recipes using any other features of the recipes. As further described below, the adjusted score is used in part to determine which recipes are displayed to the user.

The clustering module 125 of the recipe clustering server 120 clusters the recipes. Although hundreds or thousands of recipes may be recommended for a user in view of particular scoring techniques employed by the scoring module 123, the user is spared from having the sift through them one by one. Instead, the individual recipes are clustered into groups, where each group shares a common feature. Optionally, only a few high quality members of each of a plurality of groups are formatted for display to the user, and a name is selected for display in association with the group that represents the unifying feature of the group. Thus, the user can quickly navigate through a plurality of groups to identify recipes of interest. The clustering module 125 is described further with respect to FIG. 2.

The client device 130 accesses recipes through the network 140 and presents the accessed recipes to the user using presentation module 135. In one embodiment, the client device 130 is a computer, which is described further below with respect to FIG. 3. Example client devices 130 include a desktop, a laptop, a tablet, a mobile device, a smart television, and a wearable device. Using the client device 130, a user may access recipes from the recipe clustering server 120. The presentation module 135 may comprise software such as a web browser or another application for viewing recipes from the recipe clustering server 120.

The network 140 enables communications among the entities connected to it through one or more local-area networks and/or wide-area networks. In one embodiment, the network 140 is the Internet and uses standard wired and/or wireless communications technologies and/or protocols. The network 140 can include links using technologies such as Ethernet, 802.11, worldwide interoperability for microwave access (WiMAX), long term evolution (LTE), 3G, 4G, digital subscriber line (DSL), asynchronous transfer mode (ATM), InfiniBand, and/or PCI Express Advanced Switching. Similarly, the networking protocols used on the networks 170, 160 can include multiprotocol label switching (MPLS), transmission control protocol/Internet protocol (TCP/IP), User Datagram Protocol (UDP), hypertext transport protocol (HTTP), simple mail transfer protocol (SMTP), and/or file transfer protocol (FTP). The network 140 may include multiple sub-networks linked to transfer data.

The data exchanged over the network 140 can be represented using technologies and/or formats including hypertext markup language (HTML), extensible markup language (XML), and/or JavaScript Object Notation (JSON). In addition, all or some of the transmitted data can be encrypted using conventional encryption technologies such as the secure sockets layer (SSL), transport layer security (TLS), virtual private networks (VPNs), and/or Internet Protocol security (IPsec). In another embodiment, the entities use custom and/or dedicated data communications technologies instead of, or in addition to, the ones described above.

Clustering Module

Figure 2:
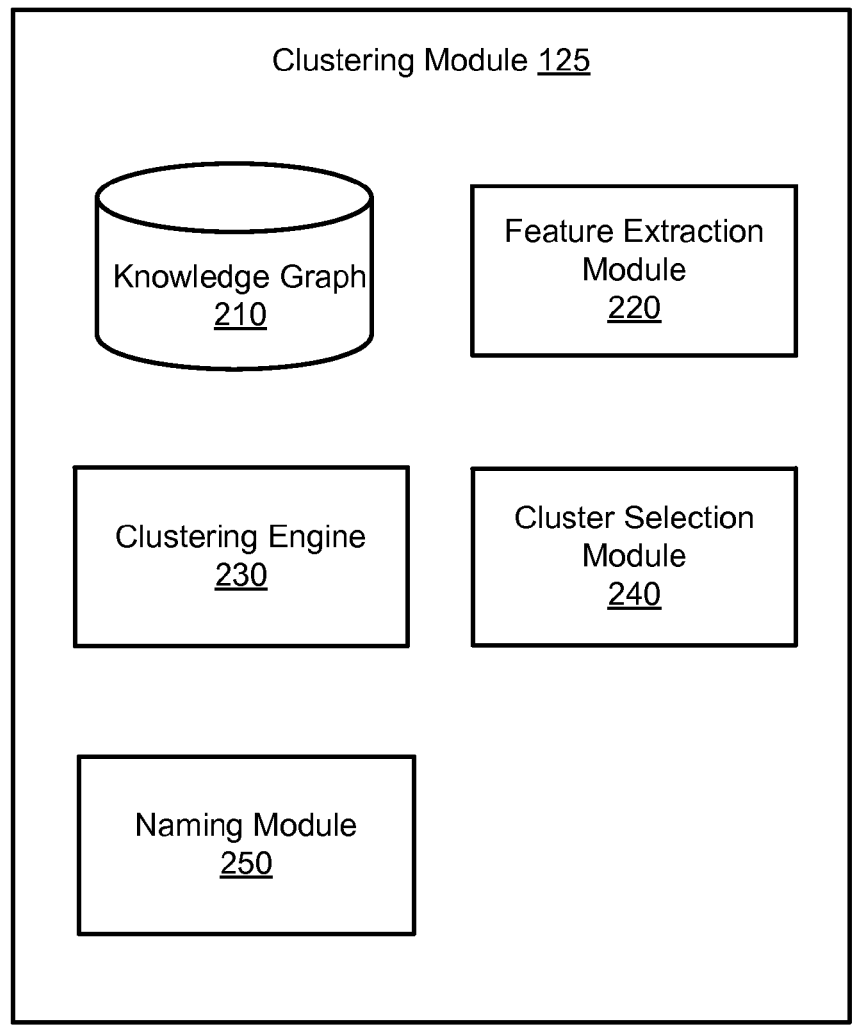
FIG. 2 is a block diagram illustrating a clustering module of a recipe clustering server, in accordance with an embodiment.

FIG. 2 is a block diagram illustrating a clustering module 125 of a recipe clustering server 120, in accordance with an embodiment. The clustering module 125 includes a knowledge graph 210, a feature extraction module 220, a clustering engine 230, a cluster selection module 240, and a naming module 250.

The clustering module 125 receives recipes from the scoring module 123, and the knowledge graph 210 of the clustering module 125 establishes relationships that are not explicit in the recipes. The recommended recipes generally include at least a recipe title, an ingredient list, and preparation steps, and may include additional metadata such as preparation time, difficulty level, source of the recipe (e.g., from a blog, from an online magazine, etc.), recipe author, serving size, number of servings, cooking technique, and the like. The knowledge graph 210 contains a graph representing food knowledge. The nodes of the graph represent ingredients, ingredient abstractions, cooking techniques, and cooking equipment. Example nodes of the graph include "apple," "gala apple," "fruit," "slicing," "peeling," "knife," and "peeler." Ingredient abstractions are broader categories of ingredients. For example, "steak" is an abstraction of "rib-eye steak." A node may be an abstraction with respect another node and an ingredient with respect to another node. For example, "beef" is an abstraction of "Wagyu beef," and "meat" is a further abstraction of "beef."

The nodes of the food knowledge graph 210 may contain attributes of a particular object on the graph. For example, nodes representing ingredients contain nutritional density information and associated allergens and dietary restrictions. Nodes representing abstractions may similarly contain average nutritional density information as well as attributes (e.g., allergens such as gluten or nuts, dietary restrictions such as halal, vegan, or kosher) common to child ingredients of a parent abstraction. As another example, nodes representing cooking techniques and cooking equipment indicate difficulty of using cooking equipment or learning a cooking technique.

Nodes of the food knowledge graph 210 are connected by edges that indicate relationships between the nodes. The food knowledge graph has different types of edges representing different relationships, and two nodes may be connected by more than one edge. For example, one type of edge explicitly indicates the parent-child relationship between an ingredient and an abstraction (e.g., "black beans are a kind of beans"). Another type of edge between two nodes representing two ingredients indicates that the ingredients have equivalent nutritional content (e.g., "a Fuji apple is the nutritional equivalent of a gala apple"). Edges may connect similar nodes, such as an edge representing substitutability between ingredients represented by two nodes. An edge between a node representing an ingredient and a node representing cooking equipment or a cooking technique indicates that the cooking equipment or technique is commonly used with that ingredient (e.g., "potatoes are often used with ovens," "potatoes are often baked"). Similarly, an edge between a node representing a cooking technique and a node representing cooking equipment indicates that the cooking equipment may be used in a cooking technique (e.g., "an oven is used for baking").

In addition to ingredients, abstractions of ingredients, cooking techniques, and cooking equipment, the knowledge graph 210 may contain nodes representing units of measure (e.g., cup, ounce, cubic centimeter, pinch). These nodes may have attributes indicating common abbreviations of the unit of measure, and edges between these nodes may represent unit conversions between dimensionally consistent units of measure. Hence, the nodes, attributes of nodes, and edges between nodes serve to organize food knowledge into the knowledge graph 210. The components of the clustering module 125 draw upon the food knowledge in the knowledge graph 210 to generate features of recipes and ultimately to cluster recipes for presentation to a user.

The feature extraction module 220 extracts features of recipes using the knowledge graph 210. Examples of extracted features of a recipe include an associated holiday (e.g., an Easter recipe, a Halloween recipe, a Thanksgiving recipe, etc.), a course (e.g., an appetizer, a dessert, etc.), a cuisine (an Italian recipe, a Thai recipe, a Mexican recipe, etc.), an ingredient used in the recipe, a source of the recipe, a brand used in the recipe, a dish (e.g., macaroni and cheese, broccoli soup, deviled eggs), a cooking technique (e.g., grilling, baking, etc.) and many others. Features can be extracted from recipes using machine learning techniques applied to a corpus of training data that has been classified by hand. Thus, models can be trained to recognize features of newly acquired recipes for scoring purposes. Rather than discarding these features that have been learned about recipes, the feature extraction module 220 can use these features again for clustering recipes as described below.

Optionally, the features extracted from the recipes by the feature extraction module 220 that are used as inputs for the clustering engine 230 are selected to be interpretable to the user as well as good descriptors of recipes. For example, knowing that a recipe has blueberries provides more information about the recipe than knowing that the recipe has salt or butter. Two measures of descriptiveness are 1) frequency: a feature that applies to more recipes is less descriptive; and 2) whether the feature is mentioned in the recipe title, which shows the recipe author views this feature as important. Other measures of descriptiveness may also be used in other implementations.

The clustering engine 230 defines and computes the distance between recipes based on the extracted features of the recipes. The more similar two recipes are to each other, the closer the recipes will mapped to each other. The distance between recipes can be inferred with reference to the knowledge graph 210, for example, to determine what cooking techniques are equivalent to each other, how closely related two ingredients are, what foods are associated with a particular holiday, and the like. In one embodiment, the clustering engine 230 examines a large plurality (e.g., several hundred) recipes in a pairwise comparison to determine which two recipes are the closest. Using an agglomerative hierarchical clustering technique, the clustering engine 230 iteratively combines recipes and clusters, starting with the closet pairs, to form a hierarchical tree structure. In one implementation, recipes and clusters are combined if they are within a threshold distance of each other, and the threshold distance is relaxed iteratively to create successive levels of the hierarchy. For example, whereas the threshold distance may be x for the first level of clustering, the threshold distance may be 2x for the second level of clustering, and 3x for the third level of clustering. Alternatively, the minimum distance cluster pair can be merged at each iteration, regardless of the distance. The minimum distances naturally become larger over the course of iterations of merging the closest pair(s).

The cluster selection module 240 selects clusters by traversing the tree structure produced by the agglomerative hierarchical clustering performed by the clustering engine 230. In one embodiment, clusters are only considered for display if they have a threshold minimum number of recipes and if all the members of the cluster have at least one feature in common. In one implementation, the hierarchical tree structure is traversed starting from the root to identify clusters that satisfy these two criteria. This generates a list of clusters. Other algorithms for traversing the tree structure may also be used. For example, if larger, more general clusters are desired, starting from the root, the tree is traversed toward the leaves until a cluster satisfies the threshold minimum number of recipes and all the members of the cluster have at least one feature in common. If more specific clusters are desired, the traversal is continued as long as both children of the current cluster (i.e., the two clusters that were merged to form the current cluster) meet the criteria.

The cluster selection module 240 may be configured to select a diversity of clusters for display to the users while still selecting among clusters that contain the highest scoring recipes. In one implementation, the cluster selection module 240 ranks the recipes within each respective cluster by score. The cluster selection module 240 may also calculate a cluster score based on the scores associated the recipes within the cluster. For example, in various implementations, the cluster score may be the average of the scores of the recipes within the cluster, or the cluster score may be median score of the top 10 scoring recipes within the cluster, or many other techniques of calculating a combined score for the cluster may be used.

The cluster selection module 240 uses an objective function that considers relevance and diversity. One computationally efficient way to optimize this objective function is to use a greedy algorithm. The greedy algorithm seeks a diversity of clusters while seeking high-scoring clusters to select the combination of clusters to display to the user. Any suitable greedy algorithm known to those of skill in the art can be used for these purposes. For example, the cluster that has the highest cluster score may be selected first, and then the next cluster is selected based on the distance between the clusters that have already been chosen and the rest of the candidate clusters. The best next selection may be determined by maximizing the value of the function:

$$\text{meanScore}(c) * e^{\alpha * \text{meanDist}(c,C')} \quad \text{fn. 1}$$

where meanScore(c) is the average score of the cluster, a is a scaling factor, C' denotes the set of clusters selected in previous iterations of the algorithm, and meanDist(c,C') is the distance between the cluster in view of the clusters that have already been chosen. The cluster selection module 240 iteratively selects clusters until a threshold number of clusters (e.g., 5, 10, 20, or any other number) have been selected for display to the user.

Optionally, the recipes to display within a cluster are also selected by the cluster selection module 240 by applying another objective function that considers relevance and diversity. One computationally efficient way to optimize this objective function is to use a greedy algorithm. The greedy algorithm selects a diversity of recipes within the cluster while still selecting high-scoring recipes within the cluster. The recipe within the cluster that has the highest score may be selected first, and then the next recipe is selected based on the distance between the recipes that have already been chosen and the rest of the recipes in the cluster. The best next selection may be determined by maximizing the value of the function:

$$\text{Score}(r) * e^{\alpha * \text{meanDist}(r,R')} \quad \text{fn. 2}$$

where Score(r) is the score of the recipe, $\alpha$ is a scaling factor, R' denotes the set of recipes selected in previous iterations of the algorithm, and meanDist(r,R') is the distance between the recipe in view of the recipes that have already been chosen. The cluster selection module 240 iteratively selects recipes within a cluster until a threshold number of recipes for the cluster (e.g., 5, 10, or any other number) have been selected for display to the user.

The naming module 250 selects a name for each cluster. The name of each cluster is representative of at least one feature that all of the members of the cluster have in common. For example, the cluster may be named for the source of the recipes in the cluster, an ingredient that is present in each of the recipes in the cluster, a holiday to which all of the recipes in the cluster are related, a course in which all of the recipes in the cluster could be served, a cuisine that describes all of the recipes in the cluster, or any other features that all the members of the cluster have in common. Optionally, the naming module 240 may map the at least one feature that all the members of the cluster have in common to a stock phrase that introduces the feature. For example, for recipe sources, the stock phrase may be "Recommended Recipes from _____" with the blank filled in with the common source of the recipes for the cluster. For ingredients, the stock phrase may be "Experimenting with _____" or "Recommended _____ Recipes" with the blank filled in with the ingredient that the recipes in the cluster share. Such stock phrases simplify the naming of the cluster so that it can be implemented automatically.

Computer System

Figure 3:
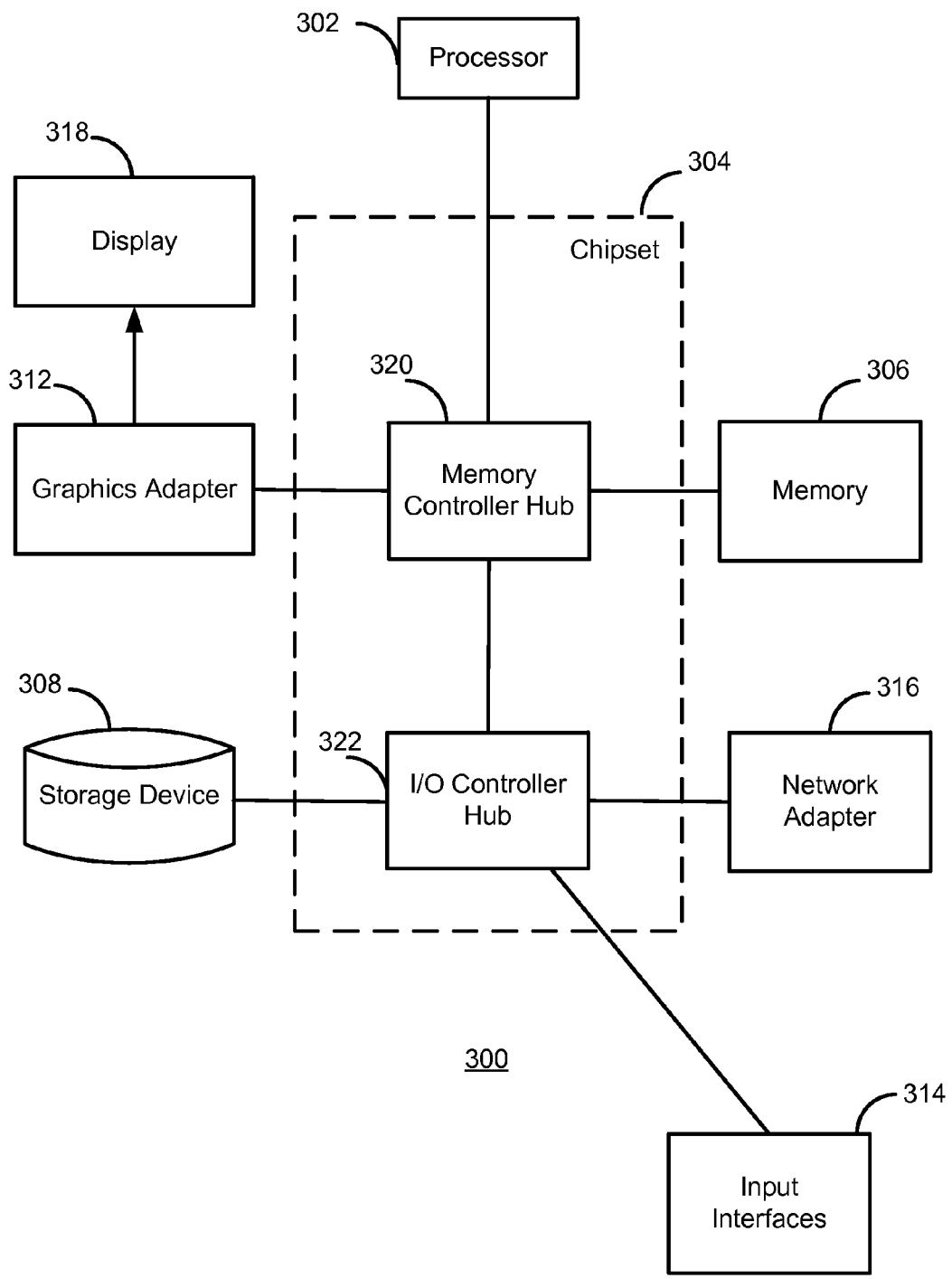
FIG. 3 is a block diagram illustrating an example computer for implementing the entities of FIG. 1, in accordance with an embodiment.

FIG. 3 is a block diagram illustrating an example computer for implementing entities in FIG. 1, in accordance with an embodiment. The computer 300 includes at least one processor 302 coupled to a chipset 304. The chipset 304 includes a memory controller hub 320 and an input/output (I/O) controller hub 322. A memory 306 and a graphics adapter 312 are coupled to the memory controller hub 320, and a display 318 is coupled to the graphics adapter 312. A storage device 308, input interfaces 314, and network adapter 316 are coupled to the I/O controller hub 322. Other embodiments of the computer 300 have different architectures.

The storage device 308 is a non-transitory computer-readable storage medium such as a hard drive, compact disk read-only memory (CD-ROM), DVD, or a solid-state memory device. The memory 306 holds instructions and data used by the processor 302. The input interfaces 314 may include a touch-screen interface, a mouse, track ball, or other type of pointing device, a keyboard, a scanner or other conventional digitizer, or some combination thereof, and is used to input data into the computer 300. The graphics adapter 312 displays images and other information on the display 318. The network adapter 316 couples the computer 300 to one or more computer networks.

The computer 300 is adapted to execute computer program modules (e.g., the scoring module 123, clustering module 124). As used herein, the term "module" refers to computer program logic used to provide the specified functionality. Thus, a module may be implemented in hardware, firmware, and/or software. In one embodiment, program modules are stored on the storage device 308, loaded into the memory 306, and executed by the processor 302.

The type of computer 300 used by the entities of the environment 100 can vary depending upon the embodiment. For example, the recipe source 110 or recipe clustering server 120 may include multiple computers 300 communicating with each other through the network 140 to provide the functionality described herein. Such computers 300 may lack some of the components described above, such as graphics adapters 312 and displays 318. As another example, the client device 130 is implemented on a mobile device, laptop, or tablet containing at least some of the components of the computer 300.

Clustering Recipes

Figure 4:
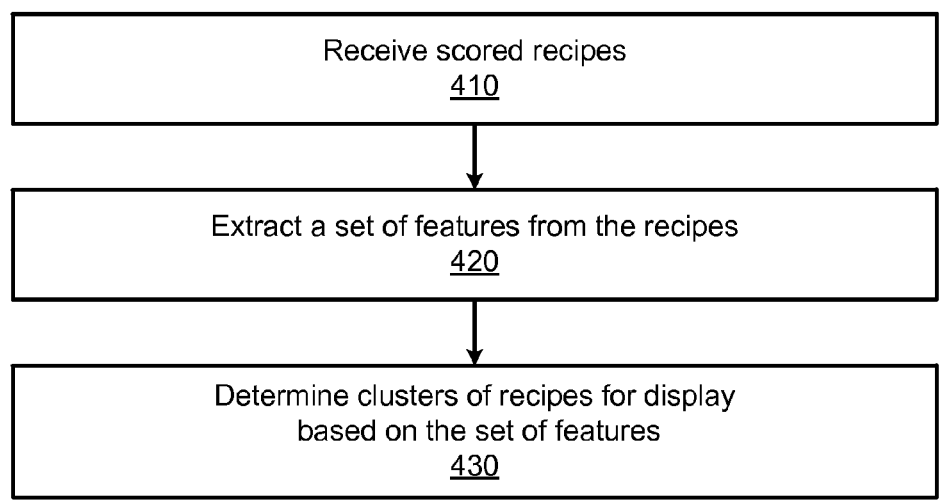
FIG. 4 is a flowchart illustrating a method of clustering recipes for display to a user, in accordance with an embodiment.

FIG. 4 is a flowchart illustrating a method of clustering recipes for display to a user, in accordance with an embodiment. The method begins in step 410 by receiving scored recipes. The scored recipes can be received, for example, from a scoring module 123 by a clustering module 125 of the recipe clustering server 120, or from an external source, such as the recipe sources 110 themselves. In one embodiment, the score of each recipe indicates how strongly the recipe is recommended for the user, plus or minus any score enhancements or penalties that are assessed to enforce other policies applicable to scoring the recipes.

In step 420, a set of features from the recipes are extracted, for example, by using the knowledge graph 210 of the clustering module. Examples of extracted features of a recipe include an associated holiday, a course, a cuisine, an ingredient used in the recipe, a source, a brand, a dish, a cooking technique, and many others. These features are retained for use by the clustering engine 230 to cluster recipes according to their features.

In step 430, based on the set of features, a plurality of clusters of recipes are determined, at least some of which are selected for display to a user. A method of determining clusters of recipes for display based on a set of features is described in detail with reference to FIG. 5.

Figure 5:
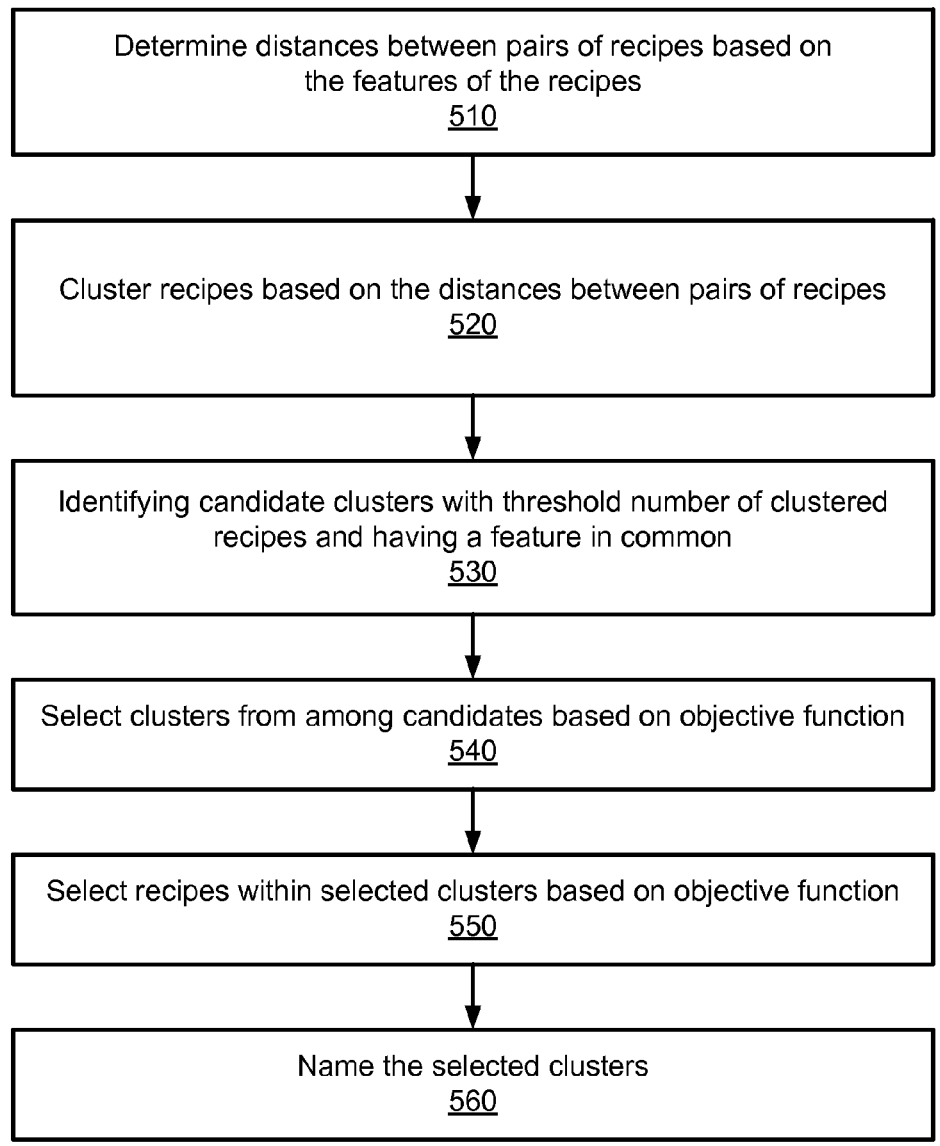
FIG. 5 is a flowchart illustrating a method of determining clusters of recipes for display based on a set of features, in accordance with an embodiment.

FIG. 5 illustrates an example method of determining clusters of recipes for display. In other examples, additional or alternative steps may be performed or the steps may be performed in other orders.

In step 510, the distances between pairs of recipes based on features in the recipes are determined. The distance between recipes can be inferred with reference to the knowledge graph 210, for example, to determine what cooking techniques are equivalent to each other, how closely related two ingredients are, what foods are associated with a particular holiday, and the like. In one embodiment, first a set of binary features for the recipes are computed using the extracted features discussed above. Each recipe can be represented as a feature vector, and any distance function known to those of skill in the art can be used to determine the distance. In one embodiment, the distance between a pair or recipes is calculated as the Jacaard distance between the features of the recipes.

Figure 6:
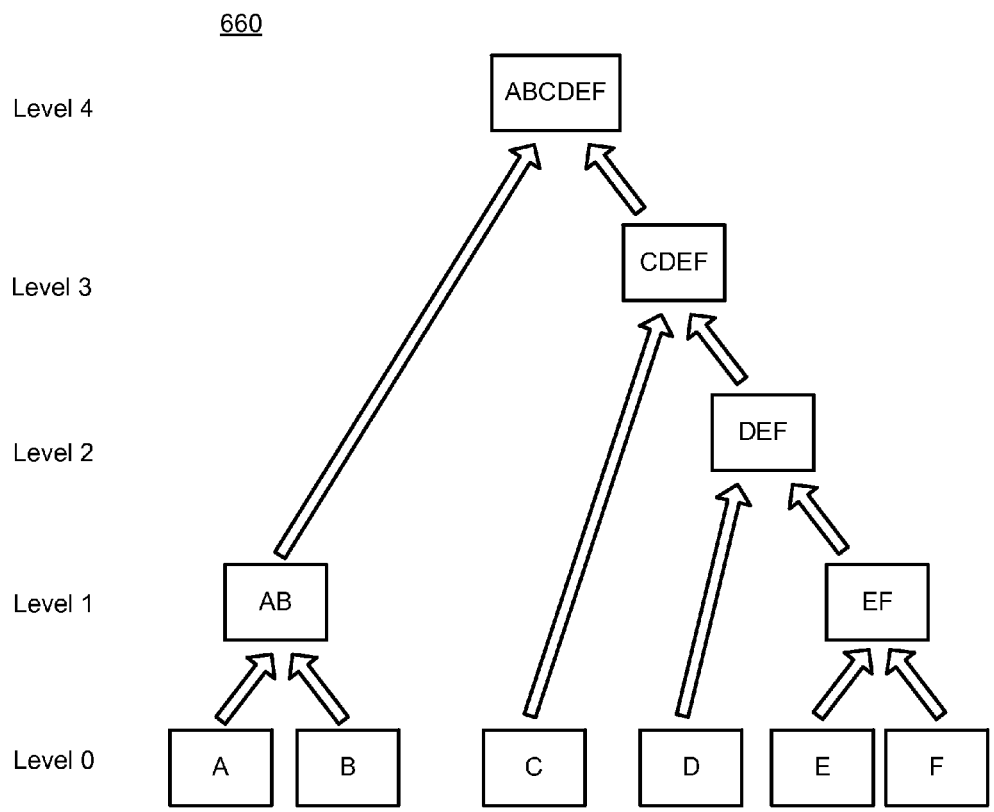
FIG. 6 is an illustration of agglomerative hierarchical clustering, in accordance with an embodiment.

In step 520, the recipes are clustered based on the distances between the pairs of the recipes. For example, the closest pairs of recipes are iteratively grouped to form an agglomerative hierarchical clustering. FIG. 6 is an illustration of agglomerative hierarchical clustering, in accordance with an embodiment. In this example, the levels are represented as horizontal layers stacked vertically into a hierarchical tree structure. As the levels increase, the threshold distance metric under which recipes will be clustered together increases. Thus, at level 1, only two pairs of recipes (AB and EF) were close enough to have been clustered, but by level 4, all of the recipes A-F were close enough together to have been clustered. Alternatively, at each level, the closest pair or pairs of clusters may be merged, regardless of the distance. The distance between the closest un-merged pairs remaining naturally becomes larger over the course of iterations of merging the pair(s) that were previously the closest. In one embodiment, to compute the distance between a pair of clusters, the maximum distance among any pair of recipes (one in each cluster) is computed. For example, if we have clusters {r1, r2} and {r3, r4}, the distance between the clusters is:

$$\text{Max}(\text{dist}(r1,r3),\text{dist}(r2,r3),\text{dist}(r1,r4),\text{dist}(r2,r4)) \qquad \text{fn. 3}$$

which finds the maximum distance among any pair of recipes between the clusters, where one member of each pair is in each cluster. This is sometimes referred to as "complete linkage" or "maximum linkage" agglomerative clustering, by those of skill in the art.

In step 530, candidate clusters that have at least a threshold number of clustered recipes and that have members that have at least one feature in common with the other members of the respective candidate cluster are identified. For example, a cluster selection module 240 may traverse the tree structure produced by the agglomerative hierarchical clustering performed by the clustering engine 230 to find all clusters that have at least 10 members, where each of the members has a feature in common with the other members of that cluster, such as containing the same ingredient, being the same cuisine type, etc.

In step 540, clusters to display to the user are selected from among the candidate clusters based on an objective function. As described above with reference to FIG. 2, an objective function is employed to select a diverse plurality of high-scoring clusters for display to the user.

In step 550, the recipes within the selected clusters to display to the user are selected from among all of the recipes within the selected cluster based on an objective function. As described above with reference to FIG. 2, another objective function can be employed to select a diverse plurality of high-scoring recipes within the cluster.

It is noted that in some alternative embodiments, the recipes within clusters may be selected before clusters are selected to display to the user. In other words, steps 540 and 550 may be performed in the reverse order. The particular recipes selected for display within each cluster can affect selection of clusters, for example, if the cluster score and distance calculations only factor in the recipes selected for display and exclude any contribution from the non-selected members of the cluster.

In step 560, the selecting clusters are named, for example by operation of the naming module 250 of the clustering module 125 of the recipe clustering server 120. The name of each cluster is representative of at least one feature that all of the members of the cluster have in common, and the name may include one or more stock phrases that introduce the feature for which the cluster is named.

Accordingly, at the conclusion of the method illustrated in FIG. 5, a diverse plurality of clusters of recipes have been selected that are likely to be appealing to the user, and the composition of the selected recipes within each cluster have been selected to be diverse while still being high-scoring recipes within the cluster. These recipes can be formatted for display to the user by the recipe clustering server 120 or the presentation module 135 of the client device 130.

Optionally, recipes that are not a member of any selected cluster at the conclusion of the method illustrated in FIG. 5 may be added to a special cluster, for example named "Also Try." Such a cluster may be used as a catch-all for recipes that were perhaps high-scoring on their own, but were not similar to enough other recipes to form a cluster with the threshold number of members, or were not in a cluster with a strong cluster score. The special cluster may be used to add variety to the display of recipes.

Figure 7:
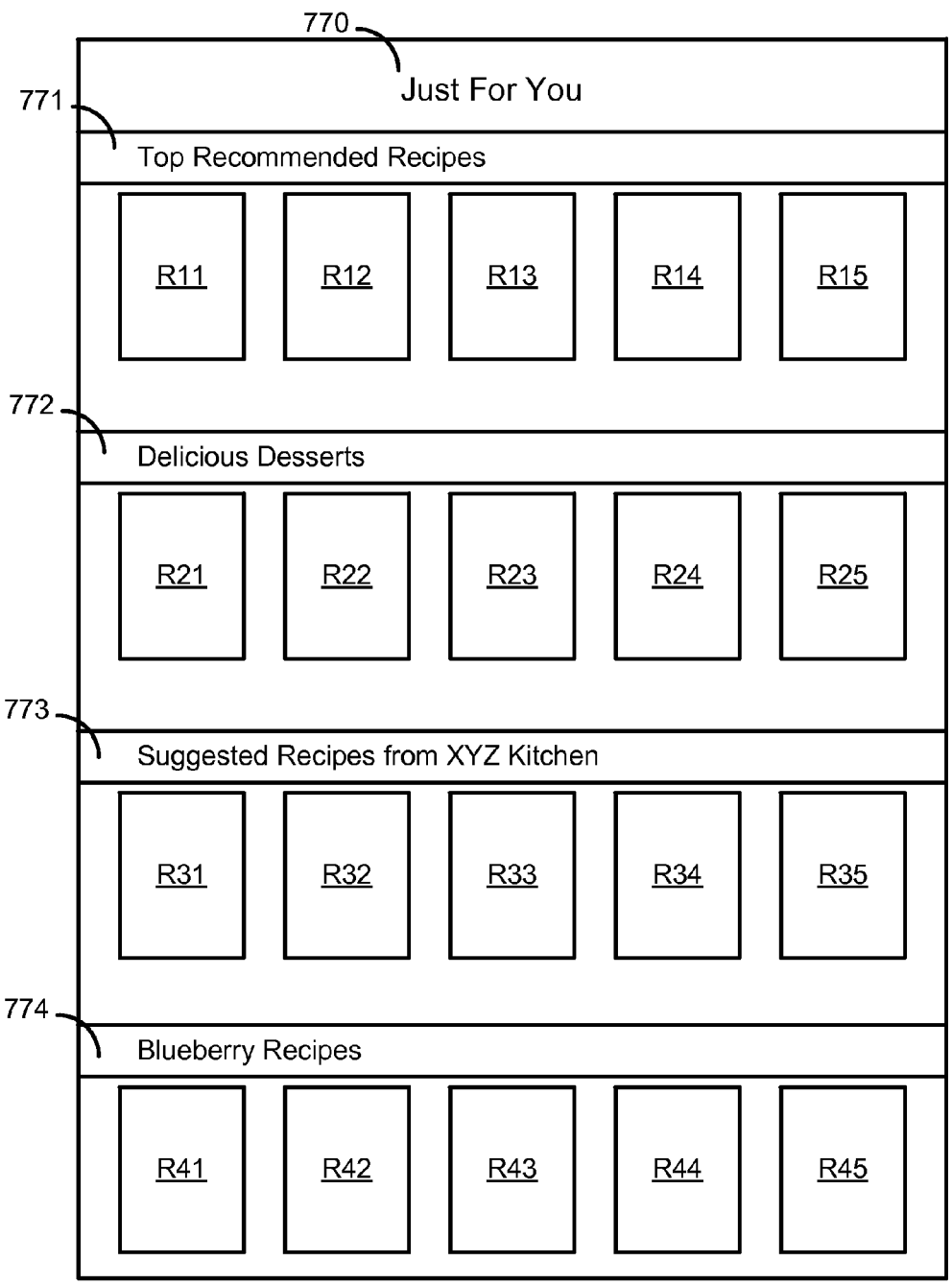
FIG. 7 is an example user interface illustrating a plurality of clusters of recipes, in accordance with an embodiment.

FIG. 7 is an example user interface illustrating a plurality of clusters of recommended recipes for a user, in accordance with an embodiment. In this example, the displayed page is recommended recipes for a user, entitled "Just For You" 770. Four clusters of recipes are displayed R11-R15, R21-25, R31-35, R41-R45, each in a horizontal line beneath the cluster names 771-774. Other layouts, such as vertical columns, stacks of recipe cards, pull-down menus, or any other grouped arrangement, are also possible. In this example, the first cluster "Top Recommended Recipes" 771 is a cluster of the highest scoring recipes R11-R15. This is an example of a special cluster that considers score as the most salient feature. The second cluster "Delicious Desserts" 772 is an example of a cluster that contains recipes R21-R25 that are from a common course, (i.e., in this example dessert). The third cluster "Suggested Recipes from XYZ Kitchen" 773 is an example of a cluster that contains recipes R31-R35 from a common source, (i.e., in this example XYZ Kitchen). The fourth cluster "Blueberry Recipes" 774 is an example of a cluster that contains recipes R41-R45 that all include a common ingredient.

Additional Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The modules described herein represent an implementation of one embodiment, but various other embodiments may include additional, fewer, or different modules to implement the methods, systems, or non-transitory, computer-readable media delineated in the accompanying claims. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A computer-implemented method of clustering recipes, the method comprising:
   receiving recipes, each recipe associated with a score;
   extracting a plurality of features from each of the recipes using a food knowledge graph;
   determining distances between a plurality of pairs of the recipes based on the plurality of features of each recipe and the food knowledge graph;
   clustering the recipes based on the distances between the pairs of recipes;
   identifying candidate clusters with a threshold number of clustered recipes, each cluster having a cluster score based on the scores of the recipes within the cluster; and
   selecting clusters for display from among the candidate clusters based on a first objective function that selects a diverse plurality of high-scoring clusters.

2. The method of claim 1, wherein the plurality of features of the recipes comprise at least one selected from a group consisting of a holiday, a course, a cuisine, a source, a brand, an ingredient, a dish, and a cooking technique associated with the recipes.

3. The method of claim 2, wherein the plurality of features of the recipes are selected based at least in part on measures of descriptiveness of the features.

4. The method of claim 1, wherein clustering the recipes based on the distances between the pairs of the recipes comprises iteratively grouping closest pairs of recipes to form an agglomerative hierarchical clustering.

5. The method of claim 1, wherein each recipe within a respective identified candidate cluster has at least one feature in common with all other recipes within the respective identified candidate cluster.

6. The method of claim 5, further comprising naming a respective identified candidate cluster with a name representative of the at least one feature that all the recipes within the respective identified candidate cluster have in common.

7. The method of claim 1 further comprising:
   selecting recipes for display from among each selected cluster based on a second objective function that selects a diverse plurality of high-scoring recipes.

8. The method of claim 1, wherein the food knowledge graph comprises nodes representing objects including ingredients and ingredient abstractions and containing attributes of the objects and edges indicating relationships between nodes connected by the edges, wherein the food knowledge graph has different types of edges representing different relationships and two nodes may be connected by a plurality of edges.

9. A non-transitory computer-readable storage medium comprising instructions for clustering recipes, the instructions when executed by a processor cause the processor to:
   receive recipes, each recipe associated with a score;
   extract a plurality of features from each of the recipes using a food knowledge graph;
   determine distances between a plurality of pairs of the recipes based on the plurality of features of each recipe and the food knowledge graph;
   cluster the recipes based on the distances between the pairs of recipes;
   identify candidate clusters with a threshold number of clustered recipes, each cluster having a cluster score based on the scores of the recipes within the cluster; and
   select clusters for display from among the candidate clusters based on a first objective function that selects a diverse plurality of high-scoring clusters.

10. The medium of claim 9, wherein the plurality of features of the recipes comprise at least one selected from a group consisting of a holiday, a course, a cuisine, a source, a brand, an ingredient, a dish, and a cooking technique associated with the recipes.

11. The medium of claim 10, wherein the plurality of features of the recipes are selected based at least in part on measures of descriptiveness of the features.

12. The medium of claim 9, wherein the instructions causing the processor to cluster the recipes based on the distances between the pairs of the recipes comprise instructions causing the processor to iteratively group closest pairs of recipes to form an agglomerative hierarchical clustering.

13. The medium of claim 9, wherein each recipe within a respective identified candidate cluster has at least one feature in common with all other recipes within the respective identified candidate cluster.

14. The medium of claim 13, the instructions further comprising instructions causing the processor to name a respective identified candidate cluster with a name representative of the at least one feature that all the recipes within the respective identified candidate cluster have in common.

15. The medium of claim 9, the instructions further comprising instructions causing the processor to:
    select recipes for display from among each selected cluster based on a second objective function that selects a diverse plurality of high-scoring recipes.

16. A system for clustering recipes, the system comprising:
    a processor; and
    a non-transitory computer-readable storage medium comprising instructions executable by the processor, the instructions for:
        receiving recipes, each recipe associated with a score;
        extracting a plurality of features from each of the recipes using a food knowledge graph;
        determining distances between a plurality of pairs of the recipes based on the plurality of features of each recipe and the food knowledge graph;
        clustering the recipes based on the distances between the pairs of recipes;
        identifying candidate clusters with a threshold number of clustered recipes, each cluster having a cluster score based on the scores of the recipes within the cluster; and
        selecting clusters for display from among the candidate clusters based on a first objective function that selects a diverse plurality of high-scoring clusters.

17. The system of claim 16, wherein the plurality of features of the recipes comprise at least one selected from a group consisting of a holiday, a course, a cuisine, a source, a brand, an ingredient, a dish, and a cooking technique associated with the recipes.

18. The system of claim 17, wherein the plurality of features of the recipes are selected based at least in part on measures of descriptiveness of the features.

19. The system of claim 16, wherein clustering the recipes based on the distances between the pairs of the recipes comprises iteratively grouping closest pairs of recipes to form an agglomerative hierarchical clustering.

20. The system of claim 16, wherein each recipe within a respective identified candidate cluster has at least one feature in common with all other recipes within the respective identified candidate cluster.

21. The system of claim 20, the medium further comprising instructions for naming a respective identified candidate cluster with a name representative of the at least one feature that all the recipes within the respective identified candidate cluster have in common.

* * * * *